United States Patent
Pan et al.

(10) Patent No.: US 8,799,228 B2
(45) Date of Patent: Aug. 5, 2014

(54) METHOD AND APPARATUS FOR PROVIDING A LIST-BASED INTERFACE TO KEY-VALUE STORES

(75) Inventors: Zane Zheng Yan Pan, Lexington, MA (US); Fujian Yang, Lexington, MA (US); Kenneth D. McCracken, Lexington, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/172,391

(22) Filed: Jun. 29, 2011

(65) Prior Publication Data

US 2013/0007007 A1 Jan. 3, 2013

(51) Int. Cl.
G06F 7/00 (2006.01)
G06F 17/00 (2006.01)
G06F 17/30 (2006.01)

(52) U.S. Cl.
CPC ................................. *G06F 17/30336* (2013.01)
USPC ............................. 707/661; 707/652; 707/809

(58) Field of Classification Search
USPC .............. 707/9, 102, 652, 661, 706; 709/219; 717/114
See application file for complete search history.

(56) References Cited

U.S. PATENT DOCUMENTS

| | | | |
|---|---|---|---|
| 5,613,105 A | 3/1997 | Zbikowski et al. | |
| 6,651,168 B1 | 11/2003 | Kao et al. | |
| 7,657,581 B2 * | 2/2010 | Orenstein et al. | 707/661 |
| 7,668,851 B2 | 2/2010 | Triplett | |
| 7,966,304 B2 * | 6/2011 | Bennett et al. | 707/706 |
| 2004/0210582 A1 * | 10/2004 | Chatterjee et al. | 707/9 |
| 2006/0004910 A1 | 1/2006 | Burd et al. | |
| 2008/0091642 A1 | 4/2008 | Bestgen et al. | |
| 2009/0164502 A1 * | 6/2009 | Dasgupta et al. | 707/102 |
| 2011/0137902 A1 | 6/2011 | Wable et al. | |
| 2012/0078850 A1 * | 3/2012 | Bryant et al. | 707/652 |

OTHER PUBLICATIONS

On-line NPL Google keywords search (Note: copies of search results have been embeded in the office action as prior art).*
Indexed Database API, W3C Working Draft, Dec. 6, 2011, pp. 1-124. http://www.w3org/TR/IndexedDB/.

* cited by examiner

*Primary Examiner* — Susan Chen
(74) *Attorney, Agent, or Firm* — Ditthavong & Steiner, P.C.

(57) ABSTRACT

An approach is provided for providing a list-based interface to key-value stores. The library interface platform determines one or more key-value pairs of at least one key-value store, the one or more key-value pairs comprising one or more data entries. Next, the library interface platform causes, at least in part, an association of at least one list object with the one or more key-value pairs, one or more sub-list objects, or a combination thereof. Then, the library interface platform provides at least one interface for performing one or more operations on the at least one list object to interact with the one or more data entries, the one or more key-value pairs, the one or more sub-list objects, or a combination thereof.

16 Claims, 11 Drawing Sheets

800

METHOD AND APPARATUS FOR PROVIDING A LIST-BASED INTERFACE TO KEY-VALUE STORES

BACKGROUND

Service providers and device manufacturers (e.g., wireless, cellular, etc.) are continually challenged to deliver value and convenience to consumers by, for example, providing compelling network services. One area of interest has been the storage and access of data. For example, there has been a recent move toward the use of key-value stores to store and access data, especially for web-related applications. Key-value stores may, for instance, allow applications to store schema-less data, generally including a string to represent the key and the actual data which is considered to be the value in a "key-value" relationship. Consequently, key-value stores may eliminate the requirement for fixed data models and reduce data formatting strictness. Nonetheless, typical key-value stores still require users to store their data using a distinguished key entry. Moreover, because of a limitation in the amount of data that may be stored per key, users may be required to save their data under many different keys. Such a constraint may conflict with the preference of some users to save a particular collection of data entries under one common name and to add, delete, or modify these data entries using the common name.

SOME EXAMPLE EMBODIMENTS

Therefore, there is a need for an approach for providing a list-based interface to key-value stores.

According to one embodiment, a method comprises determining one or more key-value pairs of at least one key-value store, the one or more key-value pairs comprising one or more data entries. The method also comprises causing, at least in part, an association of at least one list object with the one or more key-value pairs, one or more sub-list objects, or a combination thereof. The method further comprises providing at least one interface for performing one or more operations on the at least one list object to interact with the one or more data entries, the one or more key-value pairs, the one or more sub-list objects, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine one or more key-value pairs of at least one key-value store, the one or more key-value pairs comprising one or more data entries. The apparatus is also caused to associate at least one list object with the one or more key-value pairs, one or more sub-list objects, or a combination thereof. The apparatus is further caused to provide at least one interface for performing one or more operations on the at least one list object to interact with the one or more data entries, the one or more key-value pairs, the one or more sub-list objects, or a combination thereof.

According to another embodiment, a computer-readable storage medium carries one or more sequences of one or more instructions which, when executed by one or more processors, cause, at least in part, an apparatus to determine one or more key-value pairs of at least one key-value store, the one or more key-value pairs comprising one or more data entries. The apparatus is also caused to associate at least one list object with the one or more key-value pairs, one or more sub-list objects, or a combination thereof. The apparatus is further caused to provide at least one interface for performing one or more operations on the at least one list object to interact with the one or more data entries, the one or more key-value pairs, the one or more sub-list objects, or a combination thereof.

According to another embodiment, an apparatus comprises means for determining one or more key-value pairs of at least one key-value store, the one or more key-value pairs comprising one or more data entries. The apparatus also comprises means for causing, at least in part, an association of at least one list object with the one or more key-value pairs, one or more sub-list objects, or a combination thereof. The apparatus further comprises means for providing at least one interface for performing one or more operations on the at least one list object to interact with the one or more data entries, the one or more key-value pairs, the one or more sub-list objects, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing a list-based interface to key-value stores are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
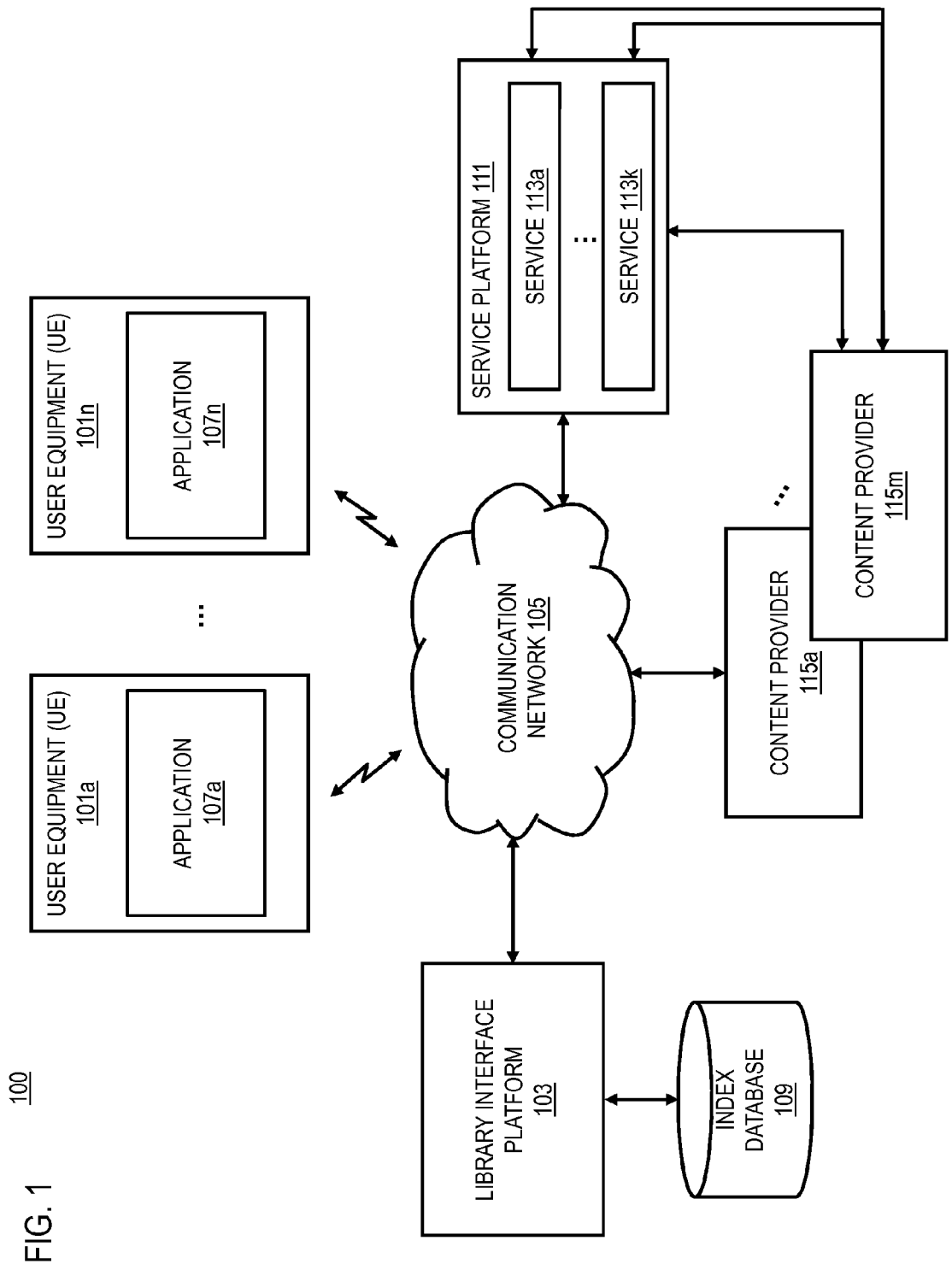
FIG. 1 is a diagram of a system capable of providing a list-based interface to key-value stores, according to one embodiment.

FIG. 1 is a diagram of a system capable of providing a list-based interface to key-value stores, according to one embodiment. As mentioned, the advantages of key-value stores over other data storage and access methods have contributed to its success. Primarily, key-value stores offer a replacement for fixed data models and a strictness reduction with respect to data formatting. However, typical systems using key-value stores still require users to store their data under many different keys because a particular system may impose limitations with regard to the amount of data that may be stored per key. Some users, on the other hand, may want to be able to save a particular collection of data entries under a common name and to add, delete, modify these data entries using the common name. Unfortunately, under typical systems, this is not possible. Although there are efforts to address such issues on the server side, these efforts may be restricted in the sense that they only work with specific key-value stores. Consequently, the inconvenience of having to satisfying the different requirements of individual key-value stores may restrict the data storage and access options of users.

To address this problem, a system 100 of FIG. 1 introduces the capability to provide a list-based interface that may, for instance, act as a client to any key-value store. In this way, the interface is decoupled from any specific key-value store implementation and makes it possible to work with any key-value store. Specifically, the system 100 may determine certain key-value pairs of a particular key-value store and associate a list object with the key-value pairs and related sub-list objects. As an example, the determined key-value pairs may comprise data entries already located in the key-value store or data entries to be saved in the key-value store. The sub-list objects may be another list object containing its own sub-list objects and key-value pairs. Moreover, the system 100 may provide an interface for performing operations on the list object to interact with the data entries, the key-value pairs, the sub-list objects, etc. As such, a user will have the ability to store and access a collection of data entries under a common of the user's choice without regard to the specific key-value store utilized. In certain embodiments, the determination of the key-value pairs and the association of the list object with the key-value pairs and the sub-list objects may even be performed on a device associated with the user (e.g., the user device may include an application for initiating the access or storage of data entries).

In one sample use case, a user may want to save data entries 1, 2, 3, 4, 5, 6, 7, 8, 9 as a list named "My List" in a particular key-value store. To meet the requirements of the particular key-value store, the data entries may be reorganized so that data entries 1, 2, 3 are saved in a key-value pair under a key "XYZ" and data entries 4, 5, 6, 7, 8, 9 are saved in a key-value pair under another key "ABC." Nonetheless, the user would not need to know the particular requirements of the key-value store or the fact that the user's data entries are saved in key-value pairs under the specific keys "XYZ" and "ABC." In this case, the system 100 has determined that the key-value entries are included in the key-value pairs under the keys "XYZ" and "ABC," and has associated the list "My List" with the key-value pairs. The user has also been provided with an interface to perform operations on the list "My List," such as adding, removing, or modifying data entries in the list "My List," as well as access data entries in the list "My List." For example, when the user wants the data entry 2 (or the second data entry) from the list "My List," the interface will know that the data entry is in the key-value pair under the key "XYZ" and return the data entry 2 to the user based on the previous determination of the key-value pairs and the association of the list "My List" with the key-value pairs.

In another scenario, there may be data entries already stored in a particular key-value store. These data entries may, for instance, be included as part of several key-value pairs with various keys. In addition, these data entries may relate to a collection of contact information saved by a particular user. The user may, for instance, want the collection of contact information to be saved under the name "My Contacts" so that future operations on the collection may be performed using the name "My Contacts." As such, the system 100 may determine the key-value pairs of the key-value store that include the related data entries and associate the collection "My Contacts" with the determined key-value pairs. Additionally, if the collection "My Contacts" includes sub-groups or the user wishes to associate sub-groups with the collection, the system 100 may also associate the collection and the key-value pairs with the sub-groups. For example, the sub-groups "My Family," "My Friends," and "My Co-Workers" may be sub-groups within the collection "My Contacts" (e.g., sub-lists objects within a list object).

More specifically, the system 100 may determine one or more key-value pairs of at least one key-value store, the one or more key-value pairs comprising one or more data entries. As discussed, the one or more data entries may be existing data entries in the at least one key-value store or data entries to be saved in the at least one key-value store, for instance, based on a user's request. The system 100 may then cause, at least in part, an association of at least one list object with the one or more key-value pairs, one or more sub-list objects, or a combination thereof. The one or more sub-list objects may, for instance, be another list object containing sub-list objects and key-value pairs. The system 100 may further provide at least one interface for performing one or more operations on the at least one list object to interact with the one or more data entries, the one or more key-value pairs, the one or more sub-list objects, or a combination thereof. In addition to access, the one or more operations may, for instance, include at least one addition, at least one removal, at least one modification, or a combination thereof with respect to the one or more data entries, the one or more key-value pairs, the one or more sub-list objects, or a combination thereof.

As shown in FIG. 1, the system 100 comprises a user equipment (UE) 101 (or UEs 101a-101n) having connectivity to a library interface platform 103 via a communication network 105. The UE 101 may include or have access to an application 107 (e.g., applications 107a-107n) to enable the UE 101 to interact with, for instance, the library interface platform 103 to provide an interface to a key-value store to a user of the UE 101. In this way, the user may be able to initiate operations, such as adding, removing, or modifying the user's data entries along with corresponding key-value pairs, sub-list objects, etc., on a particular list object. The library interface platform 103 may include or have access to an index database 109 to store indexing structures. An indexing structure may, for instance, be generated to associate the list object, the key-value pairs, the data entries, the sub-list objects, the key-value store, etc. In one embodiment, the list object may include the indexing structure. In other embodiments, the indexing structure may be independent of the particular list object (e.g., it may provide associations for a number of list structures). Moreover, the index database 109 may include one or more indices to access or obtain content (e.g., associated with list objects, key-value pairs, sub-list objects, data entries, key-value stores, etc.). The content may, for instance, be stored at or provided by a service platform 111, one or more services 113 (or services 113a-113k), one or more content providers 115 (or content providers 115a-115m), and/or other services available over the communication network 105. Accordingly, the indices may be an address or some other identifier that points to a memory or storage location associated with the service platform 111, the services 113, and/or the content providers 115.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the library interface platform 103 may determine to generate at least one indexing structure to associate the at least one list object, the one or more key-value pairs, the one or more data entries, the at least one key-value store, and/or the one or more sub-list objects. By way of example, the at least one indexing structure may be a B-tree structure where each node may comprise d-2d number of data objects (e.g., 1-2 data objects, 2-4, data objects, etc.). Each data object may, for instance, include information about a particular list object along with sub-list objects, key-value pairs, data entries, etc., associated with the respective list object along with the key-value store in which the key-value pairs, the data entries, etc., may be located. In a further embodiment, the at least one list object may include the at least one indexing structure. In the case of the example B-tree structure, for instance, each data object may instead include information about sub-list objects and/or key-value pairs associated with the at least one list object along with sub-list objects, key-value pairs, data entries, etc., associated with the respective sub-list objects and/or key-value pairs.

In another embodiment, the library interface platform 103 may determine to initiate the one or more operations on the at least one list object to interact with the one or more data entries, the one or more key-value pairs, and/or the one or more sub-list objects. The library interface platform 103 may then determine that the one or more operations are not successful and that a predetermined threshold with respect to a number of attempts of the one or more operations has not been exceeded. As an example, the library interface platform 103 may determine whether the one or more operations are successful based on a version scheme. In one scenario, a collection of data stored in a key-value store may be shared by a number of users. In such a case, when a first device (e.g. belonging to one user) initiates an add operation to the collection, the library interface platform 103 may determine that the operation was not successful if, for instance, a second device (e.g., belonging to another user) writes back to a particular key-value pair before the first device to avoid performing the add operation based on outdated information. Thus, the first device may reload the data entries of the particular key-value pair and reinitiate the add operation until it succeeds or exceeds a maximum number of attempts allowed. Thus, the library interface platform 103 may further determine to reinitiate the one or more operations on the at least one list object based on the determination that the one or more operations are not successful and that the predetermined threshold has not been exceeded. In this way, a fail-fast system with the correct states at any given point of time may be provided.

In another embodiment, the library interface platform 103 may determine that at least one of the one or more key-value pairs are outside a size range with respect to the one or more data entries. The library interface platform 103 may then cause (a) a split of the at least one of the one or more key-value pairs, and/or (b) a merge of the at least one of the one or more key-value pairs with at least another one of the one or more key-value pairs based on the determination that the at least one of the one or more key-value pairs are outside the size range. By way of example, when data entries (or the number of data entries) in a key-value pair grow to exceed the upper bound of the size range for the key-value pair, the key-value pair may be split into two or more key-value pairs. On the other hand, when data entries (or the number of data entries) in a key-value pair become less than the lower bound of the size range for the key-value pair, the key-value pair may be merged with, for instance, a neighboring key-value pair.

In another embodiment, the library interface platform 103 may determine that the at least one list object and/or at least one of the one or more sub-list objects are outside a size range with respect to the one or more sub-list objects and/or the one or more key-value pairs. The library interface platform 103 may then cause (a) a split of the at least one list object and/or the at least one of the one or more sub-list objects, (b) a merge of the at least one of the one or more sub-list objects with at least another one of the one or more sub-list objects, and/or (c) a merge of the at least one list object with at least another list object based on the determination that the at least one list object and/or the at least one of the one or more sub-list objects are outside the size range. By way of example, when sub-list objects and/or key-value pairs (or the number of sub-list objects and/or key-value pairs) in a sub-list object grow to exceed the upper bound of the size range for the sub-list object, the sub-list object may be split into two or more sub-list objects. On the other hand, when sub-list objects and/or key-value pairs (or the number of sub-list objects and/or key-value pairs) in a sub-list object become less than the lower bound of the size range for the sub-list object, the sub-list object may be merged with, for instance, a neighboring sub-list object. Moreover, the splitting and merging based on the lower and upper bounds may apply similarly to a list object.

In another embodiment, the at least one list object, the one or more key-value pairs, and/or the one or more sub-list objects may include one or more indices to (a) at least another list object, (b) at least one of the one or more key-value pairs, and/or (c) at least one of the one or more sub-list objects. That is, rather than containing the actual data itself, the at least one list object, the one or more key-value pairs, and/or the one or more sub-list objects may contain one or more indices to the actual data. In addition, the library interface platform 103 may use the one or more indices to support a growing list. As an example, a list object may include indices to sub-list objects or even to other list objects. The sub-list objects and the other list objects themselves may further include indices to their own sub-list objects or various other list objects. As such, size limitations that may be associated with list objects may be overcome.

In another embodiment, the determination of the one or more key-value pairs and/or the association of the at least one list object with the one or more key-value pairs and/or the one or more sub-list objects are performed on a device associated with a user. In one scenario, for instance, the library interface platform 103 may be included in the device associated with the user (e.g., as the application 107 in the UE 101). As such, the functions of the library interface platform 103 may be performed on the device itself. It is noted, however, that the library interface platform 103 need not be included in the device. For example, as shown in FIG. 1, the library interface platform 103 may be an independent component outside of the UE 101. Yet, regardless of its location, the interface that it provides is decoupled from any specific key-value store implementation, making it possible to work with any key-value store.

By way of example, the UE 101, the library interface platform 103, the service platform 111, the services 113, and the content providers 115 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
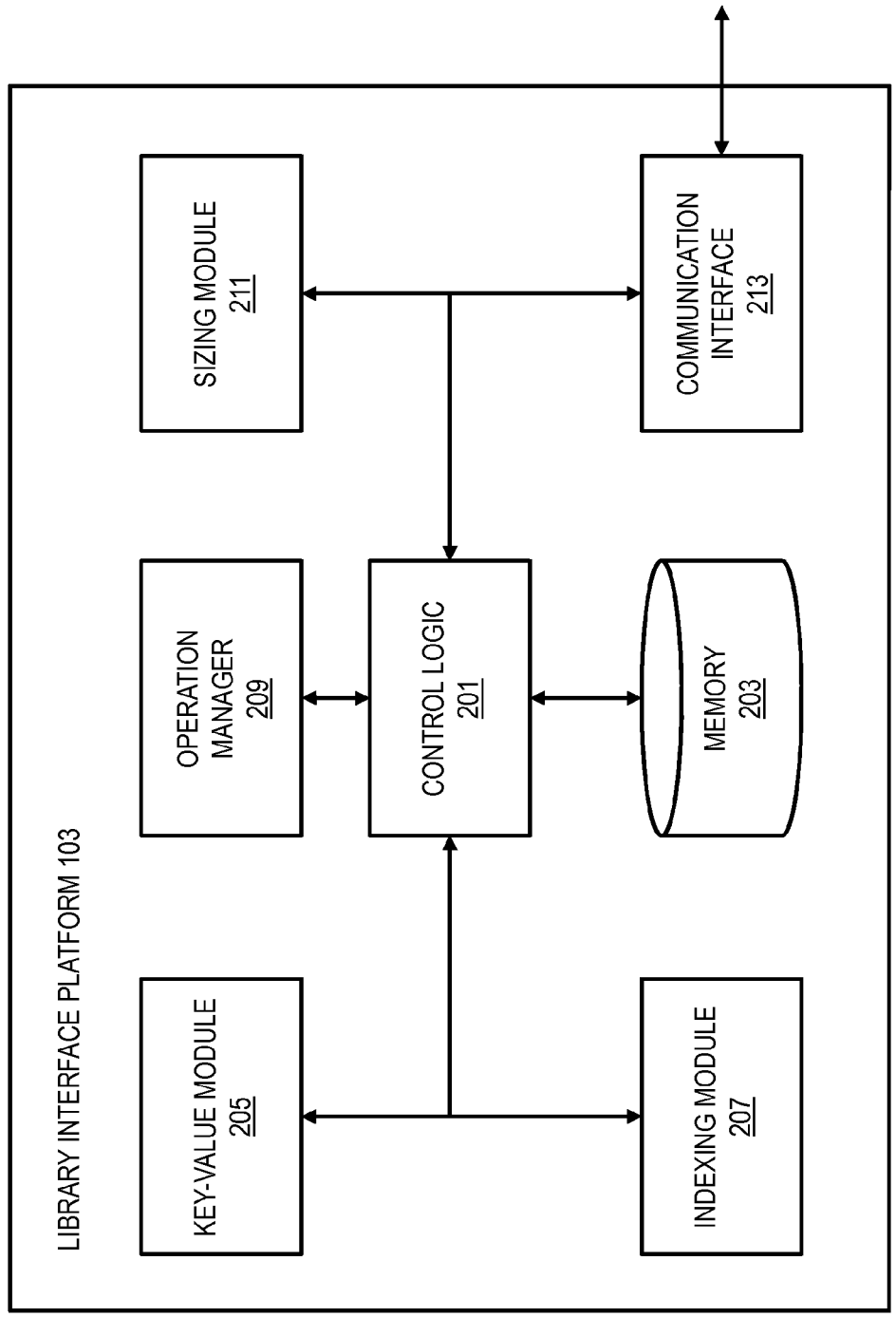
FIG. 2 is a diagram of the components of a library interface platform, according to one embodiment.

FIG. 2 is a diagram of the components of a library interface platform, according to one embodiment. By way of example, the library interface platform 103 includes one or more components for providing a list-based interface to key-value stores. It is contemplated that the functions of these components may be combined in one or more components or performed by other components of equivalent functionality. In this embodiment, the library interface platform 103 includes control logic 201, memory 203, a key-value module 205, an indexing module 207, an operation manager 209, a sizing module 211, and a communication interface 213.

The control logic 201 executes at least one algorithm for executing functions of the library interface platform 103. For example, the control logic 201 may interact with the key-value module 205 to determine key-value pairs of a key-value store that, for instance, contain data entries corresponding to a data collection which a user desires to associate under a common name (e.g., a name corresponding to a particular list object). The key-value module 205 may then work with the indexing module 207 to associate a list object with the key-value pairs as well as related sub-list objects. The indexing module 207 may further generate an indexing structure to associate the list object, the key-value pairs, the data entries, the key-value store, and/or the sub-list objects. As mentioned, in one embodiment, the generated indexing structure may be included as part of the list object. In this way, there may be an indexing structure generated for each list object to enable fast access and other operations on the list object.

Next, the control logic 201 may direct the key-value module 205 to provide an interface, for instance, to the user for performing one or more operations on the list object to interact with the data entries, the key-value pairs, sub-list objects, etc. As discussed, in addition to access, these operations may include an addition, a removal, a modification, etc., with respect to the data entries, the key-value pairs, the sub-list objects, etc.

In addition, the control logic 201 may work with the operation manager 209 to perform the one or more operations on the list object. By way of example, the operation manager 209 may initiate an operation (e.g., add, remove, modify, etc.) on the list object to interact with a particular key-value pair. Subsequently, the operation manager 209 may check to see if the operation was successful. If, for instance, the operation manager 209 determines that the operation was not successful (e.g., based on a version scheme), the operation manager 209 may then check to see whether the maximum number of attempts allowed has been reached. If the operation was not successful and the attempts threshold has not been met, the operation manager 209 may reinitiate the operation on the list object until either it is determined that the operation is successful or the maximum number of attempts has been reached.

Moreover, the control logic 201 may also interact with the sizing module 211 to ensure that the list object, the sub-list objects, and the key-value pairs stay within a size range. For example, the sizing module 211 may monitor the key-value pairs to ensure that the key-value pairs maintain a certain size with respect to its respective data entries. As described, if the data entries (or the number of data entries) of a key-value pair grow to exceed the upper bound of the size range for the key-value pair, the key-value pair may be split into two key-value pairs. On the other hand, if the data entries (or the number of data entries) in a key-value pair become less than the lower bound of the size range for the key-value pair, the key-value pair may be merged with, for instance, a neighboring key-value pair.

The control logic 201 may also utilize the communication interface 213 to communicate with other components of the library interface platform 103, the UEs 101, the service platform 111, the content providers 115, and other components of the system 100. The communication interface 213 may further include multiple means of communication. In one use case, the communication interface 213 may be able to communicate over SMS, internet protocol, instant messaging, voice sessions (e.g., via a phone network), or other types of communication.

Figure 3:
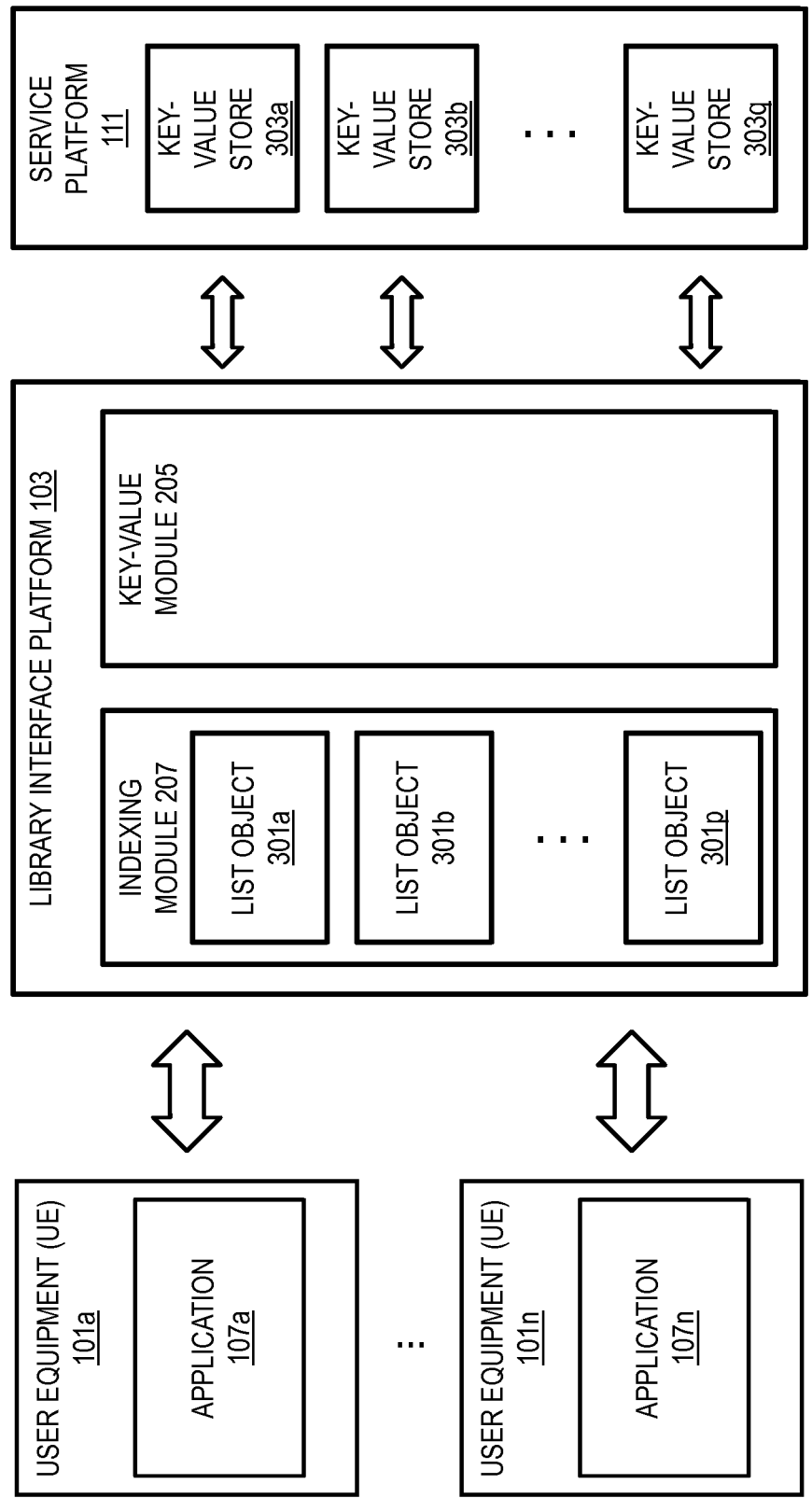
FIG. 3 is an example architecture of an interface framework, according to one embodiment.

FIG. 3 is an example architecture of an interface framework, according to one embodiment. As shown, FIG. 3 presents the UEs 101, the library interface platform 103, and the service platform 111. In this case, the UEs 101 include applications 107 for interacting with the library interface platform 103 and its components, such as the key-value module 205 and the indexing module 207. The indexing module 207, for instance, includes list objects 301 (or list objects 301a-301p), or references to the list objects 301, which may represent respective data collections associated with a user, a group of users, etc., of the UEs 101. By way of example, the indexing module 207 may generate an overall indexing structure for the list objects 301, various indexing structures for particular groups of list objects, or an indexing structure for each of the list objects 301 (e.g., such that each list object includes an indexing structure).

To support the UEs 101 with respect to the access and storage of data, the library interface platform 103 may act as a client to the key-value stores 303 (or key-value stores 303a-303q) of the service platform 111 (e.g., the key-value stores 303 may be part of various services 113 of FIG. 1). Although each of the key-value stores 303 may require various different formatting requirements and/or other methods of accessing or storing data in key-value pairs, the library interface platform 103 eliminates the need for each of the UEs 101 to know of the specific requirements for the respective key-value stores 303. As mentioned, the library interface platform 103 may determine the key-value pairs and associate the list objects 301 with respective key-value pairs and related sub-list objects and provide an interface to the users of the UEs 101 to perform one or more operations on the list objects 301 to interact with respective data entries, key-value pairs, and sub-list objects.

Figure 4:
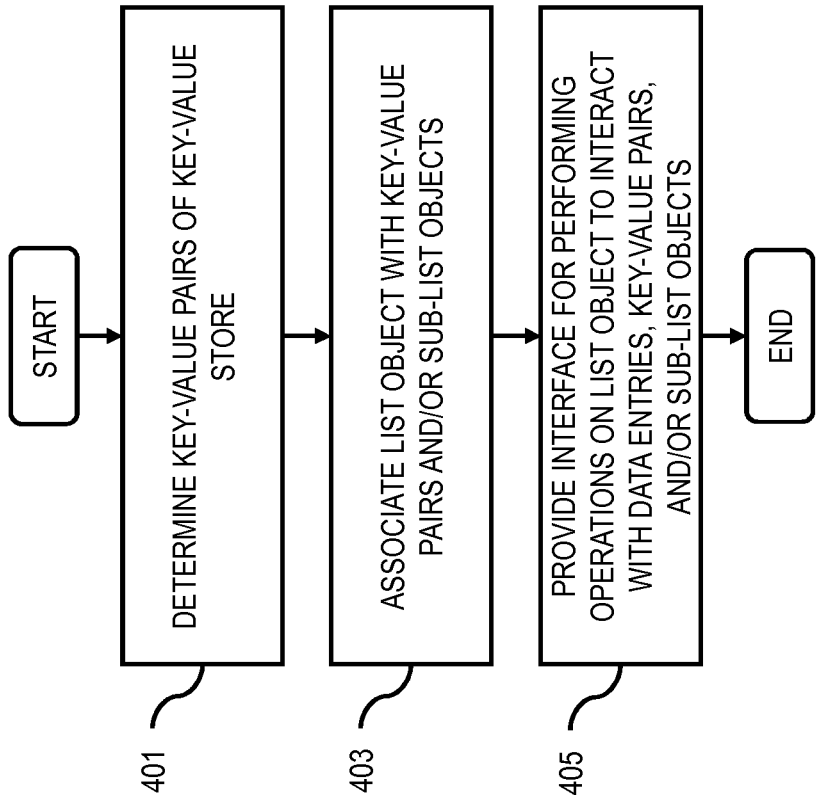
FIG. 4 is a flowchart of a process for providing a list-based interface to key-value stores, according to one embodiment.
Figure 10:
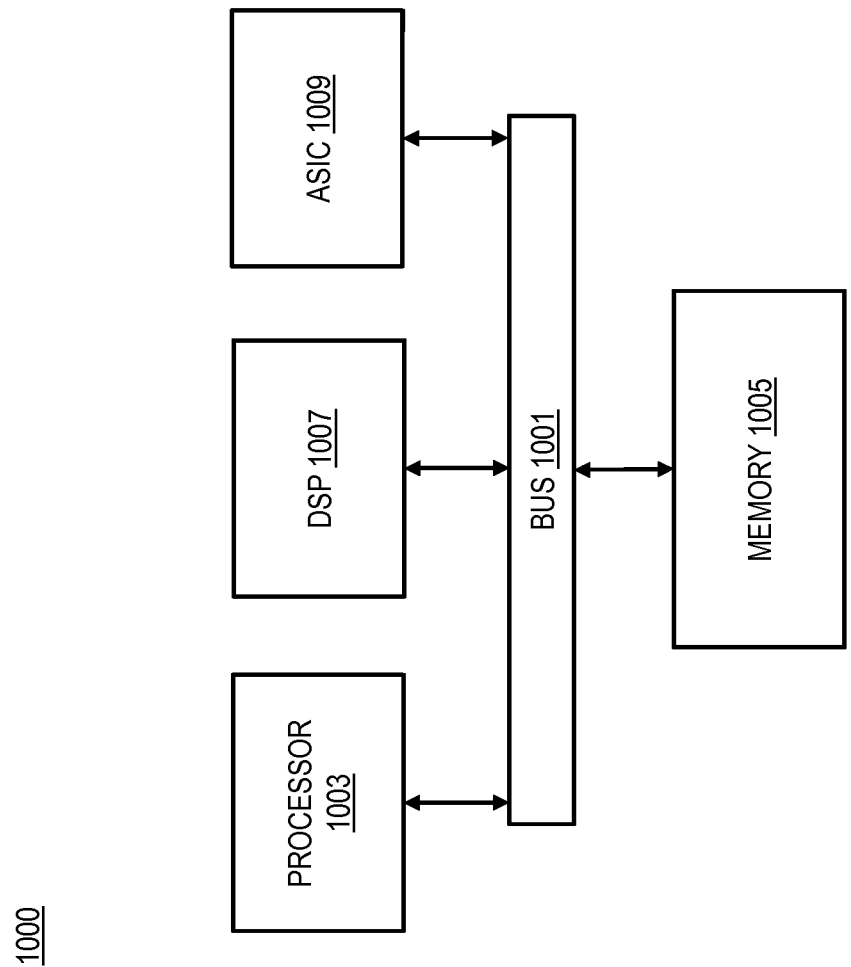
FIG. 10 is a diagram of a chip set that can be used to implement an embodiment of the invention.

FIG. 4 is a flowchart of a process for providing a list-based interface to key-value stores, according to one embodiment. In one embodiment, the control logic 201 and/or other components of the library interface platform 103 performs the process 400 and is implemented in, for instance, a chip set including a processor and a memory as shown in FIG. 10. As such, the control logic 201 can provide means for accomplishing various parts of the process 400 as well as means for accomplishing other processes in conjunction with other components of the library interface platform 103.

In step 401, the control logic 201 may determine one or more key-value pairs of at least one key-value store, the one or more key-value pairs comprising one or more data entries. As provided, the one or more data entries may be existing data entries in the at least one key-value store or data entries to be saved in the at least one key-value store, for instance, based on a user's request. The control logic 201 may then, in step 403, cause an association of at least one list object with the one or more key-value pairs and/or one or more sub-list objects. The one or more sub-list objects may, for instance, be another list object containing sub-list objects and key-value pairs.

In step 405, the control logic 201 may provide at least one interface for performing one or more operations on the at least one list object to interact with the one or more data entries, the one or more key-value pairs, and/or the one or more sub-list objects. In addition to access, the one or more operations may, for instance, include at least one addition, at least one removal, and/or at least one modification with respect to the one or more data entries, the one or more key-value pairs, and/or the one or more sub-list objects.

Figure 5:
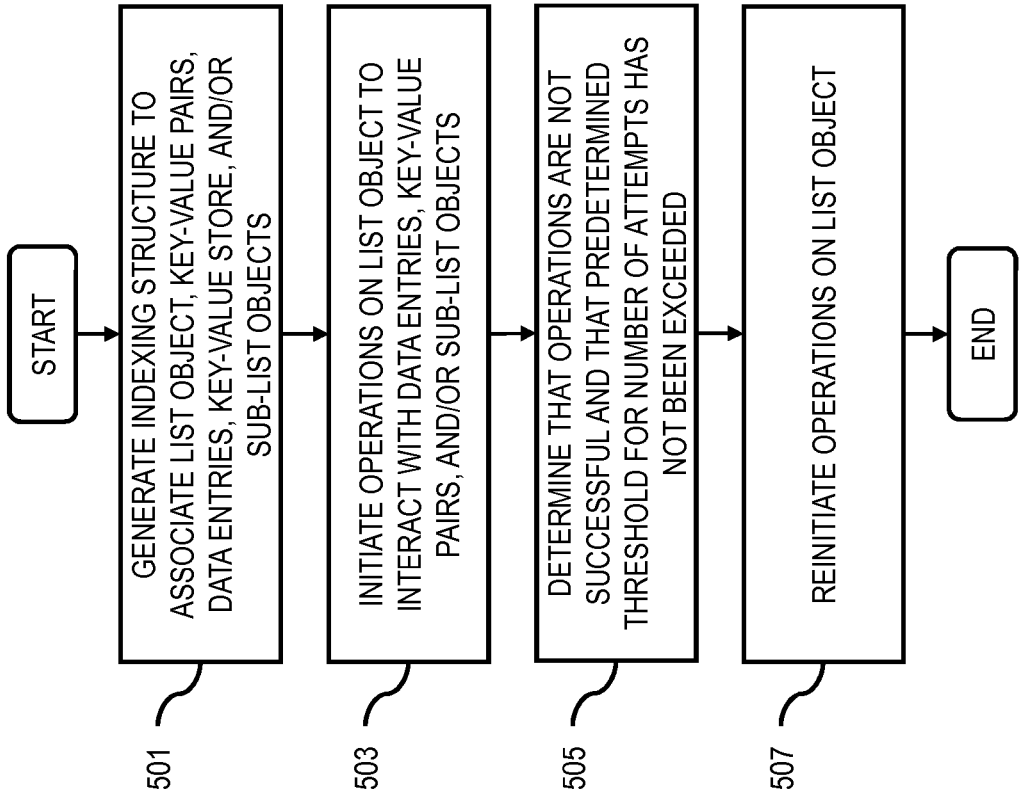
FIG. 5 is a flowchart of a process for performing operations on a list object, according to one embodiment.

FIG. 5 is a flowchart of a process for performing operations on a list object, according to one embodiment. In one embodiment, the control logic 201 and/or other components of the library interface platform 103 performs the process 500 and is implemented in, for instance, a chip set including a processor and a memory as shown in FIG. 10. As such, the control logic 201 can provide means for accomplishing various parts of the process 500 as well as means for accomplishing other processes in conjunction with other components of the library interface platform 103.

In step 501, the control logic 201 may determine to generate at least one indexing structure to associate the at least one list object, the one or more key-value pairs, the one or more data entries, the at least one key-value store, and/or the one or more sub-list objects. As discussed, the indexing structure may, for instance, be a B-tree structure. It is noted, however, that the indexing structure may also comprise of any other appropriate indexing structure (e.g., binary trees, hash tables, linked lists, etc.). In addition, according to one embodiment, the at least one list object may include the at least one indexing structure.

In step 503, the control logic 201 may determine to initiate the one or more operations on the at least one list object to interact with the one or more data entries, the one or more key-value pairs, and/or the one or more sub-list objects, for instance, based on the generated indexing structure. For example, the indexing structure may be utilized to determine the location of the one or more data entries within the at least one key-value store in order to modify at least one of the one or more data entries. If, for instance, the control logic 201 determines that the one or more operations are successful, it may then update the indexing structure to reflect the changes with respect to the at least one list object, the one or more sub-list objects, the one or more key-value pairs, the one or more data entries, and/or the at least one key-value store.

However, the control logic 201 may, as in step 505, determine that the one or more operations are not successful and that a predetermined threshold with respect to a number of attempts of the one or more operations has not been exceeded. As described, this determination may be based on a version scheme, for instance, relating to a particular key-value pair that may be affected by the one or more operations. Based on this determination, the control logic 201 may, as in step 507, determine to reinitiate the one or more operations on the at least one list object. Furthermore, the control logic 201 may continue to reinitiate the one or more operations until it is determined that the one or more operations are successful or that the predetermined threshold with respect to the number of attempts has been exceeded.

Figure 6:
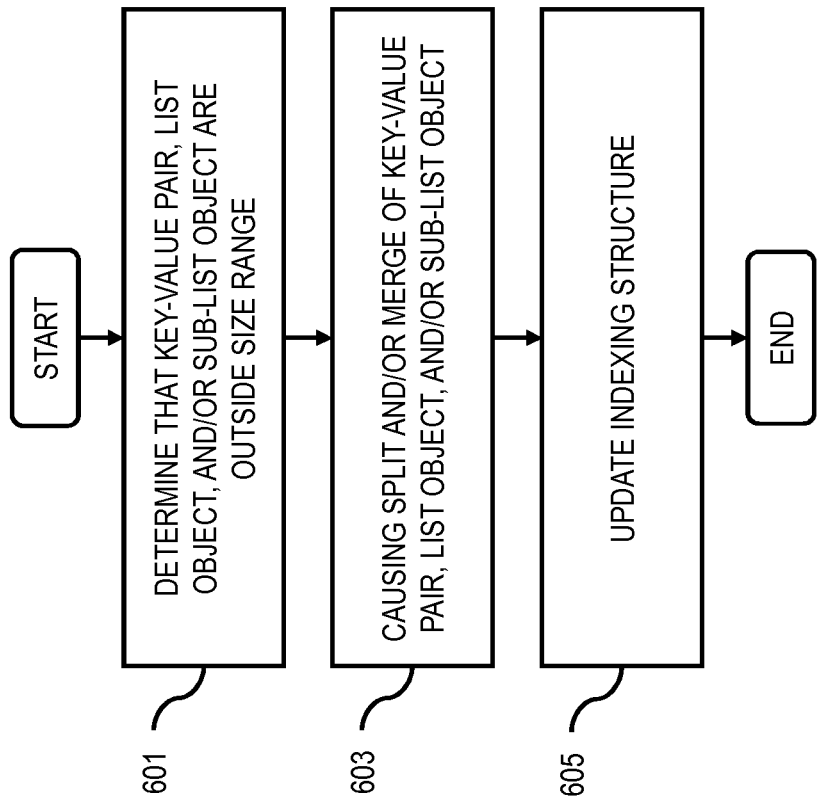
FIG. 6 is a flowchart of a process for regulating size of interface-related objects, according to one embodiment.

FIG. 6 is a flowchart of a process for regulating size of interface-related objects, according to one embodiment. In one embodiment, the control logic 201 and/or other components of the library interface platform 103 performs the process 600 and is implemented in, for instance, a chip set including a processor and a memory as shown in FIG. 10. As such, the control logic 201 can provide means for accomplishing various parts of the process 600 as well as means for accomplishing other processes in conjunction with other components of the library interface platform 103.

In step 601, the control logic 201 may determine that at least one of the one or more key-value pairs, the at least one list object, and/or at least one of the one or more sub-list objects are outside a size range. The size range may, for instance, be with respect to the one or more data entries (e.g., the size of the data entries of a particular key-value pair), the one or more sub-list objects (e.g., the size of the sub-list objects of a particular list object or sub-list object), and/or the one or more key-value pairs (e.g., the size of the key-value pairs of a particular list object or sub-list object).

If, for instance, it is determined that the at least one of the one or more key-value pairs are outside the size range, the control logic 201 may, in step 603, cause (a) a split of the at least one of the one or more key-value pairs and/or (b) a merge of the at least one of the one or more key-value pairs with at least another one of the one or more key-value pairs. As an example, a key-value pair may be split into two key-value pairs when the data entries in the key-value pair grow to exceed the upper bound of the size range for the key-value pair. Also, a key-value pair may be merged with a neighboring key-value pair when the data entries in the key-value pair become less than the lower bound of the size range for the key-value pair.

Similarly, if it is determined that the at least one list object and/or the at least one of the one or more sub-list objects are outside the size range, the control logic 201 may, in step 603, cause (a) a split of the at least one list object and/or the at least one of the one or more sub-list objects, (b) a merge of the at least one of the one or more sub-list objects with at least another one of the one or more sub-list objects, and/or (c) a merge of the at least one list object with at least another list object. As an example, a sub-list object may be split into two sub-list objects when the sub-list objects and/or the key-value pairs of the sub-list object grow to exceed the upper bound of the size range for the sub-list object. Also, a sub-list object may be merged with a neighboring sub-list object when the sub-list objects and/or the key-value pairs of the sub-list object become less than the lower bound of the size range for the sub-list object. Moreover, the splitting and merging based on the lower and upper bounds may apply similarly to a list object.

By splitting or merging certain key-value pairs, sub-list objects, and list objects, excessive fragmentation of data and overflow of data in these key-value pairs, sub-list objects, and list objects may be avoided. Following either a merge or a split, the control logic 201 may, as in step 605, determine to update the indexing structure. In this way, any changes caused by splits and merges may be reflected in the indexing structure.

Figure 7A:
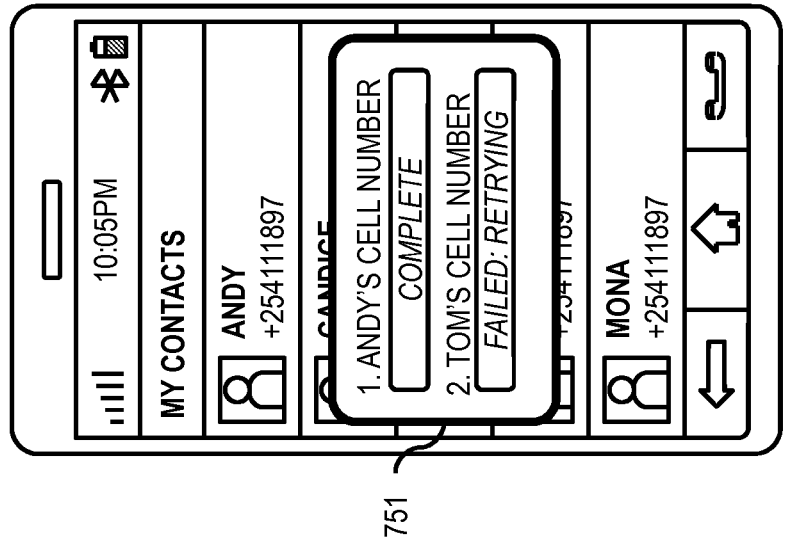
FIGS. 7A-7C are diagrams of user interfaces utilized in the processes of FIGS. 3 and 4, according to various embodiments.
Figure 7B:
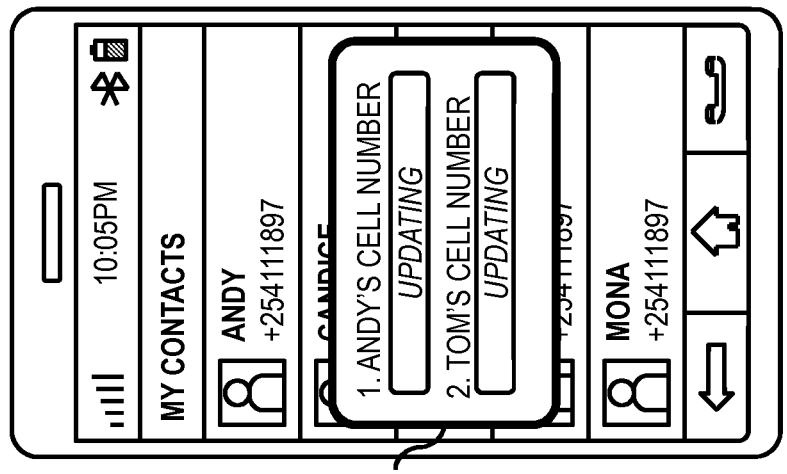
Figure 7C:
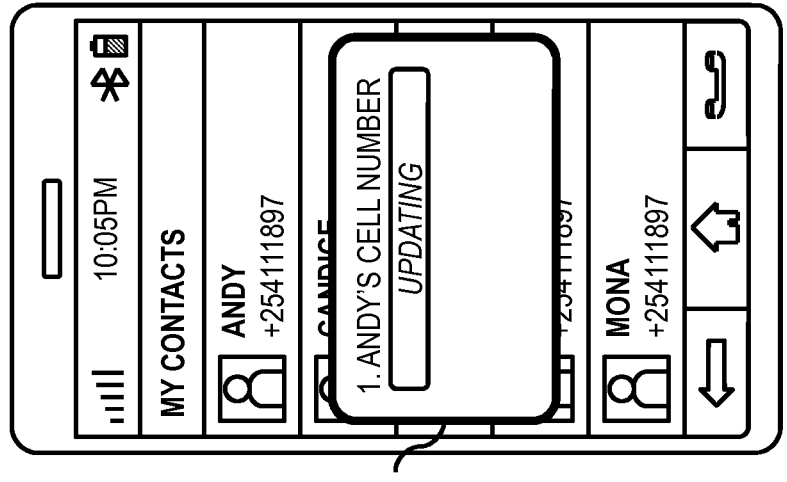

FIGS. 7A-7C are diagrams of user interfaces utilized in the processes of FIGS. 3 and 4, according to various embodiments. FIG. 7A illustrates a user interface 700 that features a prompt 701. As shown, a user is provided with the user interface 700 relating to a collection of contact information which the user has named "My Contacts." In this case, the actual data entries corresponding to the contact information may be located in a key-value store. To access the data, the key-value pairs which contain the corresponding data entries were determined and a list object corresponding to the collection was then associated with the key-value pairs along with related sub-list objects. As part of the association process, an indexing structure was generated and includes information relating to the list object (e.g., representing the collection "My Contacts") as well as respective sub-list objects, key-value pairs, data entries, and the key-value store. Here, the prompt 701 demonstrates that the user has initiated a modification of "Andy's Cell Number" (or the first modification operation) based on the indexing structure. By way of example, the indexing structure may include information with respect to a version for each of the key-value pairs. The data entries corresponding to "Andy's Cell Number" may, for instance, be stored in a key-value pair labeled with the version "001." As part of the first modification operation, the key-value pair located in the key-value store may be relabeled to "002." As such, the indexing structure is instructed to reflect such changes when the first modification operation is deemed successful.

FIG. 7B illustrates a user interface 730 that features a prompt 731. As shown by the prompt 731, the user of FIG. 7A has initiated a modification of "Tom's Cell Number" (or the second modification operation) based on the indexing structure. In this case, the second modification operation happens to require modification with respect to data entries in the same key-value pair containing the data entries corresponding to "Andy's Cell Number." As such, it may be required that the second modification operation be performed on version "002" of the key-value pair.

FIG. 7C illustrates a user interface 750 that features a prompt 751. As shown by the prompt 751, the modification of "Andy's Cell Number" (or the first modification operation) is completed. On the other hand, the modification of "Tom's Cell Number" (or the second modification operation) has failed at least once and is currently being reinitiated. As an example, the second modification operation may have reached the key-value pair before the first modification operation was performed. As such, the version of the key-value pair was still version "001" at the time the second modification operation reached the key-value pair. Thus, because the second modification operation may have included instructions to only modify version "002" of the key-value pair, a fail signal may have been returned along with an indication that the maximum number of attempts has not been reached. Consequently, the second modification operation was then reinitiated. Based upon the completion of the first modification operation, the indexing structure was updated to reflect the modification change. When, or if, the second modification operation is completed (e.g., returns a success signal), the indexing structure may also be updated to reflect the modification.

In addition to the circumstances in FIGS. 7A-7C, the system 100 may also provide a fail-fast system with correct states for situations where a collection of data stored in a key-value store may be shared by a number of users. As discussed, the requirements of each key-value store may vary, such as the way certain operations must be performed. By way of example, a key-value store may provide read and write operations for key-value pairs, but may not support atomic modifications. In one embodiment, the system 100 may in such a case require two steps to perform a modification operation: (1) read the data entries from the key-value pair along with its version information (e.g., based on an e-tag version scheme) and modify a local copy of the data entries; and (2) write the modified data entries back to the key-value pair only if the version information currently associated with the key-value pair is determined to be the same as the version information obtained in step 1.

As an illustration, two users may be trying to modify data entries in the same key-value pair where a first device (e.g., belonging to one user) may initiate a modification operation on the data entries before a second device (e.g., belonging to another user). The first modification operation (associated with the first device) may read the data entries from the key-value pair along with the version information. For instance, the version information may have been "001" at the time of the reading. Subsequently, a local copy of the data entries may have been modified to reflect the changes required by the first modification operation. However, before the modified copy of the first modification operation is written to the key-value pair, the second modification operation may have read the data entries from the key-value pair along with the version information "001," modified a local copy of the data entries to reflect the changes of the second modification operation, and then wrote its modified copy to the key-value pair. Consequently, the version information for the key-value pair may then be updated (e.g., "002") to reflect that the data entries in the key-value pair has changed. As a result, when the first modification operation attempts to write its modified copy to the key-value pair, it may be determined to be unsuccessful because the current version information for the key-value pair is different from the version information initially obtained. Thus, the first modification operation will be required to repeat steps 1 and 2 until it is determined to be successful or the number of attempts allowed is exceeded.

Figure 8:
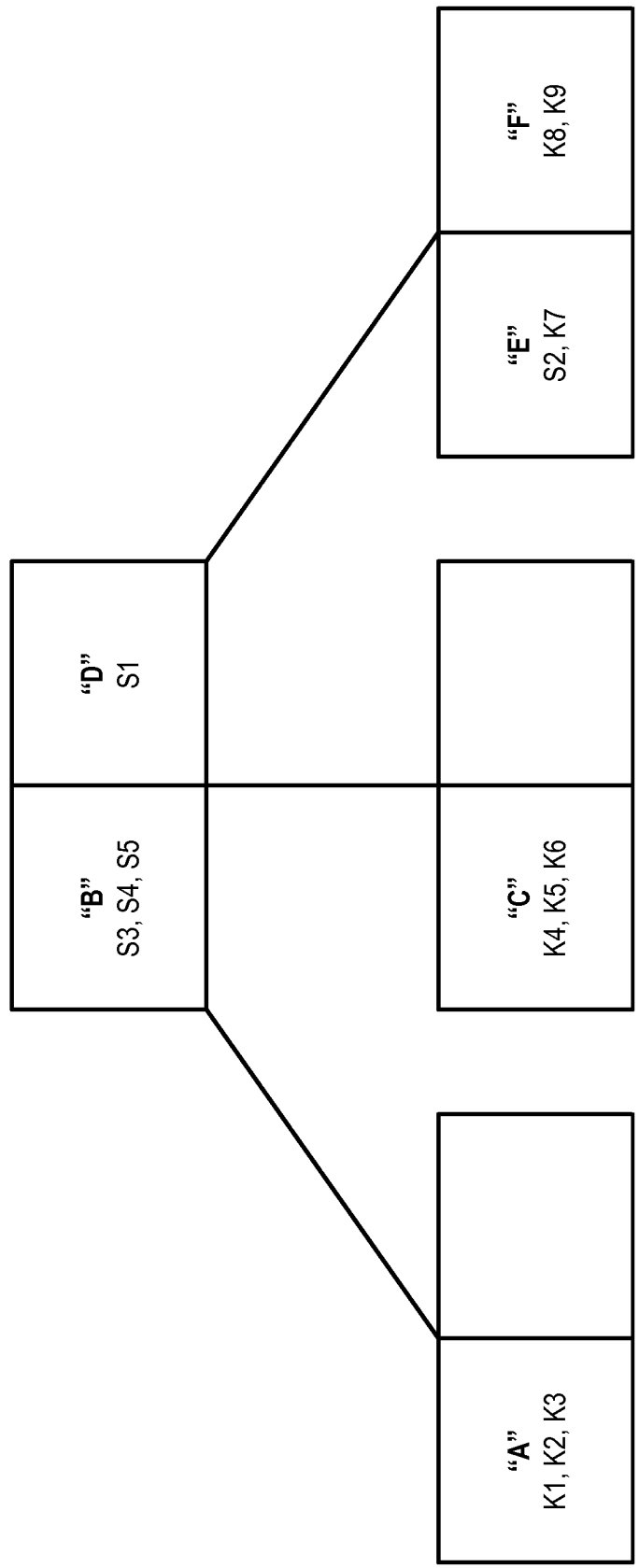
FIG. 8 is a diagram of an indexing structure for providing a list-based interface to key-value stores, according to one embodiment.

FIG. 8 is a diagram of an indexing structure for providing a list-based interface to key-value stores, according to one embodiment. Here, the indexing structure 800 is shown as a B-tree structure with an order of 2. Each node in the indexing structure 800 may contain up to 2 data objects. For simplification purposes, the data objects are shown with a corresponding list object along with sub-list objects and key-value pairs directly associated with the respective list object. As an example, the root node includes data objects "B" and "D, which correspond to respective list objects "B" and "D." As indicated, the list object "B" includes sub-list objects "S3," "S4," and "S5," and the list object "D" includes sub-list objects "S1."

It is noted, however, that the data objects (and thus the list objects) may also include other information, such as information relating to sub-list objects or key-value pairs associated with the illustrated sub-list objects and key-value pairs (e.g., sub-list objects or key-value pairs associated with sub-list objects "S1" through S5 and key-value pairs "K1" through "K9"). Further information may include version-related data (e.g., version of key-value pairs), size information, etc. It is further noted that a similar indexing structure may be included with a list object, such that the data objects may correspond to sub-list objects or key-value pairs within the list object.

The processes described herein for providing a list-based interface to key-value stores may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
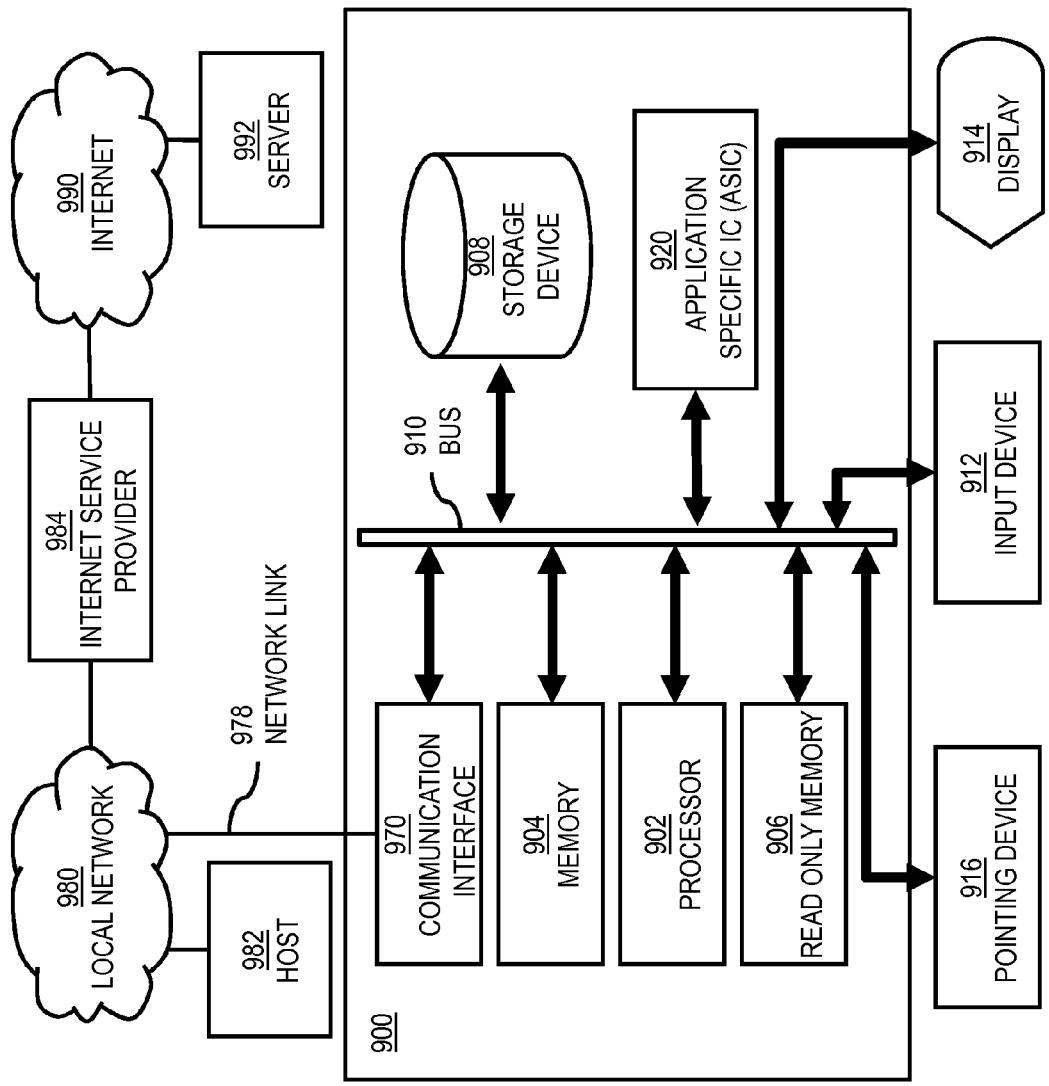
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to provide a list-based interface to key-value stores as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of providing a list-based interface to key-value stores.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to providing a list-based interface to key-value stores. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for providing a list-based interface to key-value stores. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing a list-based interface to key-value stores, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for providing a list-based interface to key-value stores to the UE 101.

The term "computer-readable medium" as used herein refers to any medium that participates in providing information to processor 902, including instructions for execution.

Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to provide a list-based interface to key-value stores as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of providing a list-based interface to key-value stores.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide a list-based interface to key-value stores. The memory 1005 also stores the data associated with or generated by the execution of the inventive steps.

Figure 11:
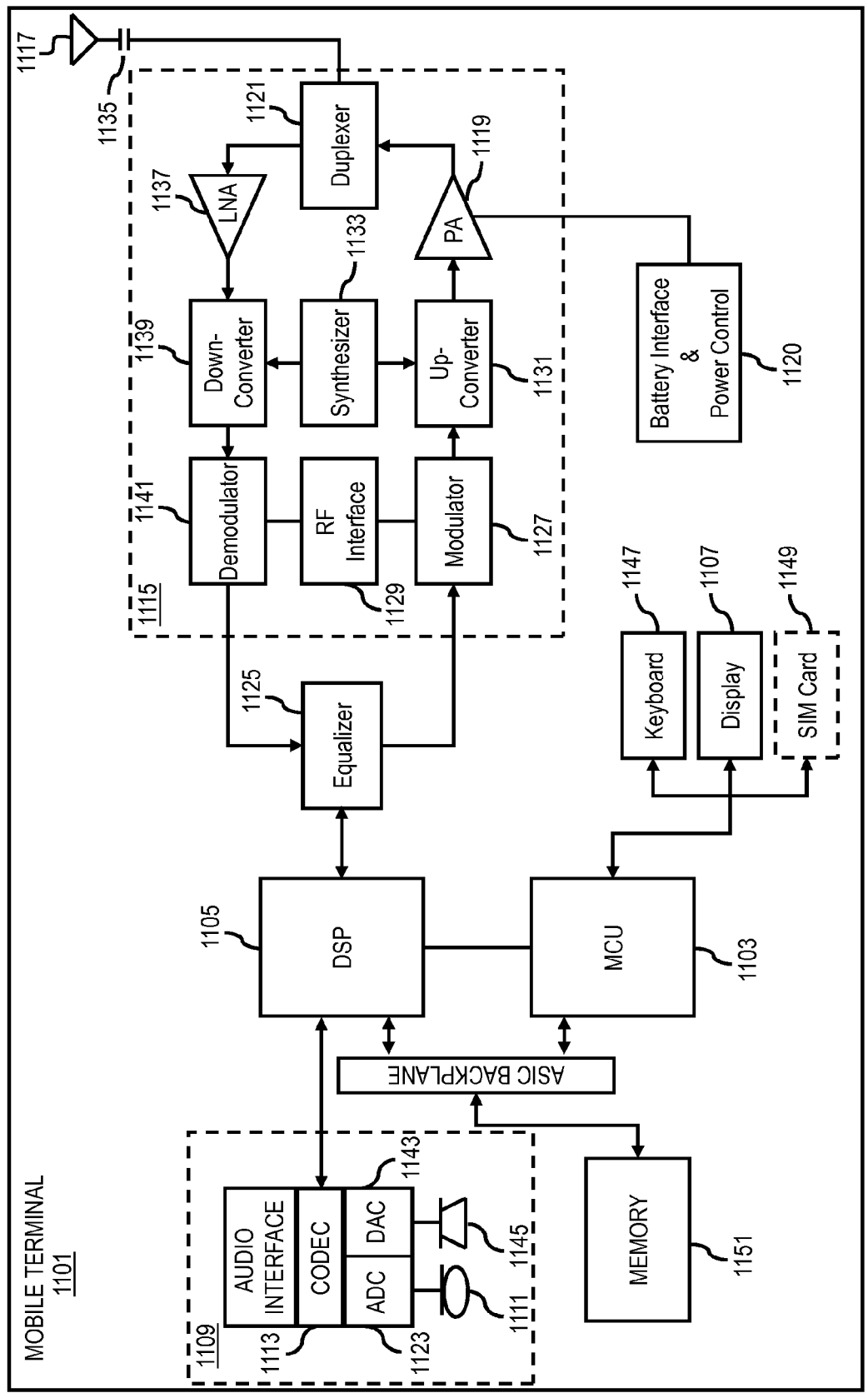
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of providing a list-based interface to key-value stores. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of providing a list-based interface to key-value stores. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to provide a list-based interface to key-value stores. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:

at least one determination, by a processor, of one or more key-value pairs of at least one key-value store, the one or more key-value pairs comprising one or more keys and one or more respective data entries, wherein the at least one key-value store is configured to store the one or more data entries using the one or more keys;

an association of at least one list object with the one or more key-value pairs, one or more sub-list objects, or a combination thereof;

at least one determination to provide at least one interface for performing one or more operations on the at least one list object, wherein the one or more operations interact with the one or more data entries, the one or more key-value pairs, the one or more sub-list objects, or a combination thereof based on the association;

at least one determination to generate at least one indexing structure to associate the at least one list object, the one or more key-value pairs, the one or more data entries, the at least one key-value store, the one or more sub-list objects, or a combination thereof;

at least one determination that at least one of the one or more key-value pairs are outside a size range with respect to the one or more data entries; and (a) a split of the at least one of the one or more key-value pairs, (b) a merge of the at least one of the one or more key-value pairs with at least another one of the one or more key-value pairs, (c) or a combination thereof based, at least in part, on the determination that the at least one of the one or more key-value pairs are outside the size range.

2. A method of claim 1, wherein the at least one list object includes, at least in part, the at least one indexing structure.

3. A method of claim 1, wherein the one or more operations comprises at least one addition, at least one removal, at least one modification, or a combination thereof with respect to the one or more data entries, the one or more key-value pairs, the one or more sub-list objects, or a combination thereof.

4. A method of claim 1, wherein the (1) data and/or (2) information and/or (3) at least one signal are further based, at least in part, on the following:

at least one determination to initiate the one or more operations on the at least one list object to interact with the one or more data entries, the one or more key-value pairs, the one or more sub-list objects, or a combination thereof;

at least one determination that the one or more operations are not successful and that a predetermined threshold with respect to a number of attempts of the one or more operations has not been exceeded; and at least one determination to reinitiate the one or more operations on the at least one list object based, at least in part, on the determination that the one or more operations are not successful and that the predetermined threshold has not been exceeded.

5. A method of claim 4, wherein the determination that the one or more operations are not successful is based, at least in part, on a version scheme.

6. A method of claim 1, wherein the (1) data and/or (2) information and/or (3) at least one signal are further based, at least in part, on the following:

at least one determination that the at least one list object, at least one of the one or more sub-list objects, or a combination thereof are outside a size range with respect to the one or more sub-list objects, the one or more key-value pairs, or a combination thereof;

(a) a split of the at least one list object, the at least one of the one or more sub-list objects, or a combination thereof, (b) a merge of the at least one of the one or more sub-list objects with at least another one of the one or more sub-list objects, (c) a merge of the at least one list object with at least another list object, (d) or a combination thereof based, at least in part, on the determination that the at least one list object, the at least one of the one or more sub-list objects, or a combination thereof are outside the size range; and at least one determination to update the indexing structure based, at least in part, on the split, merge of the at least one of the one or more sub-list objects, merge of the at least one list object, or a combination thereof.

7. A method of claim 1, wherein the at least one key-value store is configured to store a first data entry using a first data format and a second data entry using a second data format incompatible with the first data format.

8. A method of claim 1, wherein the at least one list object, the one or more key-value pairs, the one or more sub-list objects, or a combination thereof include one or more indices to (a) at least another list object, (b) at least one of the one or more key-value pairs, (c) at least one of the one or more sub-list objects, (d) or a combination thereof.

9. An apparatus comprising:
at least one processor; and
at least one memory including computer program code for one or more programs,
the at least one memory and the computer program code configured to, with the at least one processor, cause the apparatus to perform at least the following,
determine one or more key-value pairs of at least one key-value store, the one or more key-value pairs comprising one or more keys and one or more respective data entries, wherein the at least one key-value store is configured to store the one or more data entries using the one or more keys;
cause, at least in part, an association of at least one list object with the one or more key-value pairs, one or more sub-list objects, or a combination thereof;
provide at least one interface for performing one or more operations on the at least one list object, wherein the one or more operations interact with the one or more data entries, the one or more key-value pairs, the one or more sub-list objects, or a combination thereof based on the association;
determine to generate at least one indexing structure to associate the at least one list object, the one or more key-value pairs, the one or more data entries, the at least one key-value store, the one or more sub-list objects, or a combination thereof;
determine that at least one of the one or more key-value pairs are outside a size range with respect to the one or more data entries; and
cause, at least in part, (a) a split of the at least one of the one or more key-value pairs, (b) a merge of the at least one of the one or more key-value pairs with at least another one of the one or more key-value pairs, (c) or a combination thereof based, at least in part, on the determination that the at least one of the one or more key-value pairs are outside the size range.

10. An apparatus of claim 9, wherein the at least one list object includes, at least in part, the at least one indexing structure.

11. An apparatus of claim 9, wherein the one or more operations comprises at least one addition, at least one removal, at least one modification, or a combination thereof with respect to the one or more data entries, the one or more key-value pairs, the one or more sub-list objects, or a combination thereof.

12. An apparatus of claim 9, wherein the apparatus is further caused to:
determine to initiate the one or more operations on the at least one list object to interact with the one or more data entries, the one or more key-value pairs, the one or more sub-list objects, or a combination thereof;
determine that the one or more operations are not successful and that a predetermined threshold with respect to a number of attempts of the one or more operations has not been exceeded; and
determine to reinitiate the one or more operations on the at least one list object based, at least in part, on the determination that the one or more operations are not successful and that the predetermined threshold has not been exceeded.

13. An apparatus of claim 12, wherein the determination that the one or more operations are not successful is based, at least in part, on a version scheme.

14. An apparatus of claim 9, wherein the apparatus is further caused to:
determine that the at least one list object, at least one of the one or more sub-list objects, or a combination thereof are outside a size range with respect to the one or more sub-list objects, the one or more key-value pairs, or a combination thereof; and
cause, at least in part, (a) a split of the at least one list object, the at least one of the one or more sub-list objects, or a combination thereof, (b) a merge of the at least one of the one or more sub-list objects with at least another one of the one or more sub-list objects, (c) a merge of the at least one list object with at least another list object, (d) or a combination thereof based, at least in part, on the determination that the at least one list object, the at least one of the one or more sub-list objects, or a combination thereof are outside the size range.

15. An apparatus of claim 9, wherein the data entries include a first data entry of a first data format and a second data entry of a second data format incompatible with the first data format.

16. An apparatus of claim 9, wherein the at least one list object, the one or more key-value pairs, the one or more sub-list objects, or a combination thereof include one or more indices to (a) at least another list object, (b) at least one of the one or more key-value pairs, (c) at least one of the one or more sub-list objects, (d) or a combination thereof.

* * * * *